(12) United States Patent
Hasselbusch et al.

(10) Patent No.: US 6,435,628 B1
(45) Date of Patent: Aug. 20, 2002

(54) GUIDING ARRANGEMENT FOR A TRACK TYPE WORK MACHINE

(75) Inventors: Michael D. Hasselbusch, Metamora; Roy L. Maguire, Edelstein; Darby R. Robertson, Morton, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/645,150

(22) Filed: Aug. 24, 2000

(51) Int. Cl.$^7$ .............. B60B 19/00; B60S 1/62; B62D 55/14
(52) U.S. Cl. .......... 305/109; 305/116; 305/129
(58) Field of Search ............ 305/107, 109, 305/110, 116, 124, 126, 129, 130, 135, 138

(56) References Cited

U.S. PATENT DOCUMENTS

| | | | | |
|---|---|---|---|---|
| 2,049,693 A | * | 8/1936 | Eberhard | 305/109 |
| 2,989,351 A | * | 6/1961 | Deysher et al. | 305/109 |
| 3,336,087 A | * | 8/1967 | Reinsma | 305/109 |
| 3,601,454 A | * | 8/1971 | Reinsma | 305/109 |
| 4,082,371 A | * | 4/1978 | Werner et al. | 305/109 |
| 4,229,053 A | * | 10/1980 | Cline | 305/109 |
| 4,391,341 A | * | 7/1983 | Taghon | 305/109 |
| 4,582,367 A | * | 4/1986 | Jacquet et al. | 305/116 |
| 4,799,805 A | | 1/1989 | Tanaka | |
| D303,264 S | | 9/1989 | Comellas | |
| 5,045,030 A | | 9/1991 | Cunningham | |
| 5,096,270 A | * | 3/1992 | Oilund et al. | 305/116 |
| 5,104,205 A | * | 4/1992 | Motomura et al. | 305/109 |
| 5,139,317 A | * | 8/1992 | Larson et al. | 305/109 |
| 5,697,486 A | | 12/1997 | Krampl | |
| 5,752,575 A | | 5/1998 | Oertley | |
| 5,829,849 A | | 11/1998 | Lawson | |
| 6,267,458 B1 | * | 7/2001 | Hansen et al. | 305/107 |

FOREIGN PATENT DOCUMENTS

FR 2436703 * 4/1980 .............. 305/109

* cited by examiner

*Primary Examiner*—S. Joseph Morano
*Assistant Examiner*—Jason R. Bellinger
(74) *Attorney, Agent, or Firm*—Maginot, Moore & Bowman; Calvin E. Glastetter; Jeff A. Greene

(57) ABSTRACT

A guiding arrangement has a guide structure having an opening defined therein. The guiding arrangement also has a roller assembly. The guiding arrangement further has an axle positioned relative to the guide structure so that a portion of the axle is located within the opening.

20 Claims, 7 Drawing Sheets

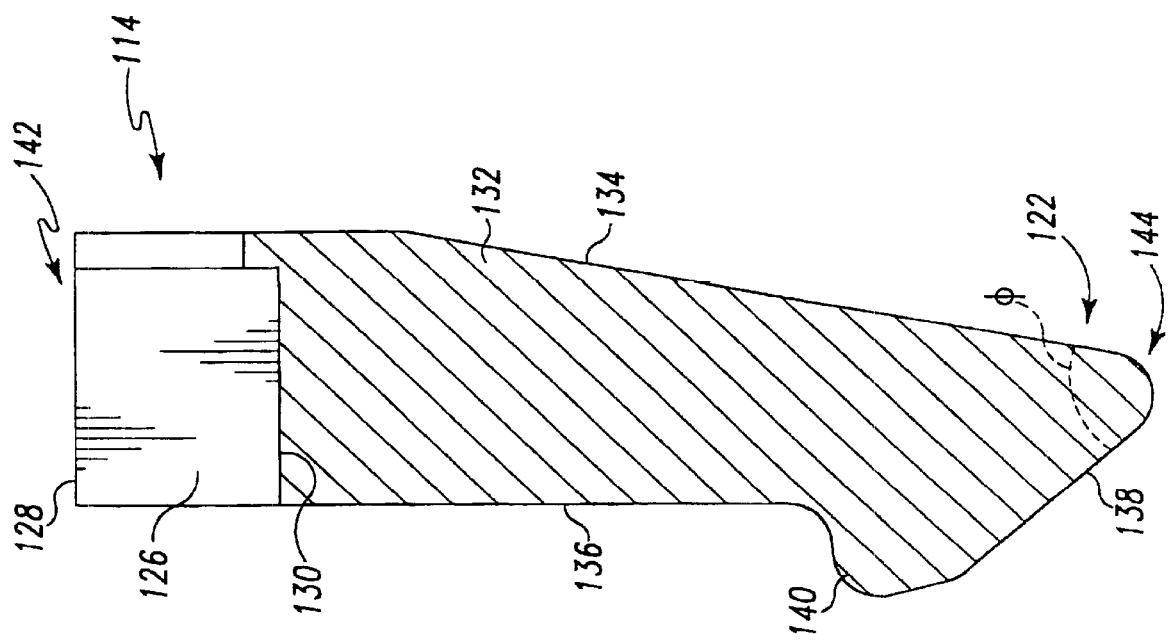
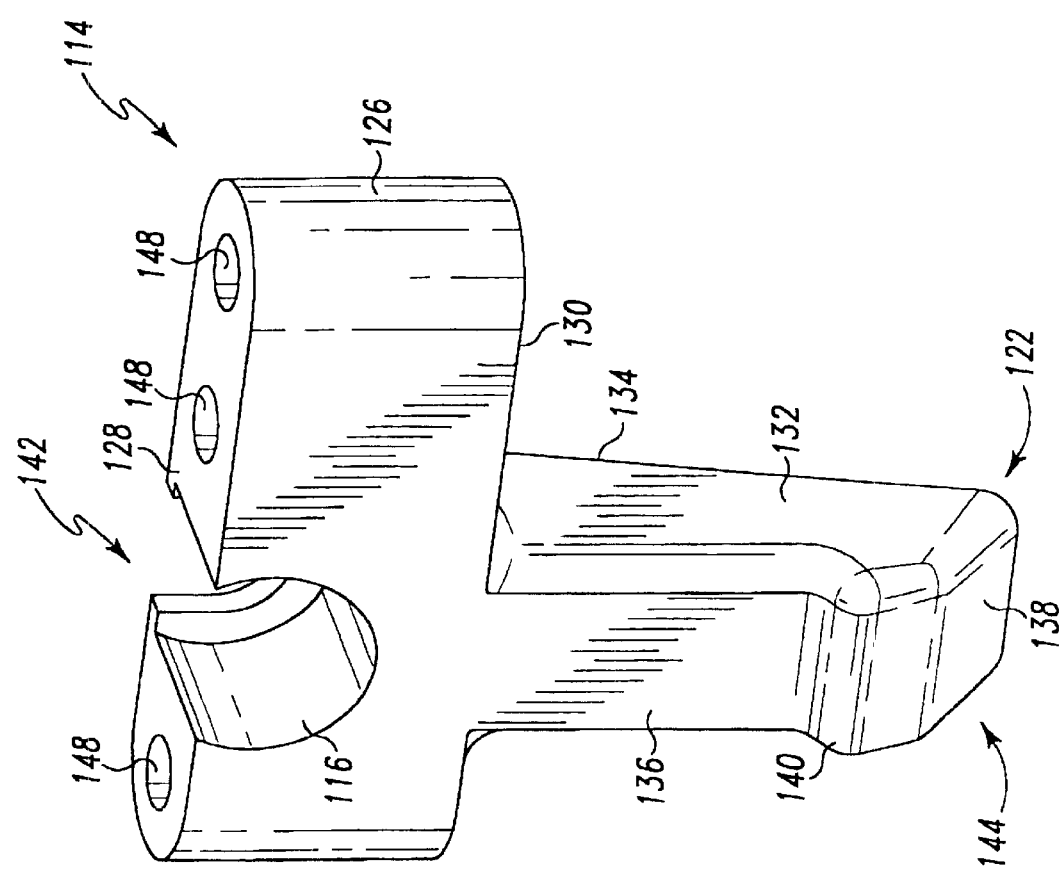
Fig. 7
Fig. 6

GUIDING ARRANGEMENT FOR A TRACK TYPE WORK MACHINE

TECHNICAL FIELD

This invention relates generally to track type work machines and, more particularly, to a guiding arrangement for a track type work machine.

BACKGROUND ART

Earthmoving and construction vehicles which utilize endless track chains to support and propel the vehicle often experience disengagement of the track chain from the rollers. Although the rollers are generally provided with flanges to guide the track chain as it passes along the rollers, irregular ground conditions may allow the track chain to fall away from the rigidly positioned rollers. Additionally, debris is often trapped between the rollers and the track chain and forces the track chain to disengage from the rollers. This can derail the track chain and thus cause damage to the undercarriage components. To prevent track chain disengagements, various types of guides have been proposed.

One type of guide is disclosed in U.S. Pat. No. 5,139,317, issued on Aug. 18, 1992, to Larson et al. The guides disclosed in this patent include a support bracket assembly secured to the roller frame. The guides also include a plurality of track guide bars secured to the support bracket assembly. Lateral movement of the track causes track links of the track chain to engage the guide bars thereby preventing any further lateral movement of the track chain. However, having the support bracket only attached to the roller frame fails to locate the guide bars in a position relative to the track chain for optimum guiding.

Another type of track guiding guard is disclosed in U.S. Pat. No. 5,104,205, issued on Apr. 14, 1992, to Montomura et al. The track guiding guard disclosed in this patent includes a pair of left and right elongated guard members which rotatably support track rollers. However, having an elongated geometry increases the weight and the cost of manufacturing the track guiding guard.

What is needed therefore is a guiding arrangement for a track type work machine which overcomes one or more of the above-mentioned drawbacks.

DISCLOSURE OF THE INVENTION

In accordance with one embodiment of the present invention, there is provided a guiding arrangement for a track type work machine. The guiding arrangement includes a guide structure having an opening defined therein. The guiding arrangement also includes a roller assembly having a body member with (i) a passageway extending therethrough, (ii) a roller surface defined thereon, and (iii) an annular flange extending from the roller surface. The guiding arrangement further includes an axle positioned relative to the body member and the guide structure so that (i) a first portion of the axle is located within the passageway and (ii) a second portion of the axle is located within the opening. The annular flange has a diameter $D_1$. The guide structure has a width $W_3$. The guide structure is positioned relative to the annular flange so that a detached end of the guide structure extends beyond a peripheral edge of the annular flange. The width $W_3$ is less than the diameter $D_1$ so that the guide structure is interposed a first vertical tangential line $L_1$ and a second vertical tangential line $L_2$ of the annular flange.

In accordance with another embodiment of the present invention, there is provided an undercarriage for a track type work machine. The undercarriage includes an undercarriage frame and a guide structure having (i) a first end and a second end and (ii) an opening defined therein. The undercarriage also includes a roller assembly having a body member with (i) a passageway extending therethrough, (ii) a roller surface defined thereon, and (iii) an annular flange extending from the roller surface. The undercarriage further includes an axle positioned relative to the body member and the guide structure so that (i) a first portion of the axle is located within the passageway and (ii) a second portion of the axle is located within the opening such that the guide structure extends outwardly in a radial direction from an axis of rotation of the body member. The undercarriage also includes a track link positioned in contact with the roller surface. The first end of the guide structure is secured to the undercarriage frame. The annular flange has a diameter $D_1$. The guide structure has a width $W_3$. The guide structure is positioned relative to the annular flange so that the second end of the guide structure extends beyond a peripheral edge of the annular flange. The width $W_3$ is less than the diameter $D_1$ so that the guide structure is interposed a first vertical tangential line $L_1$ and a second vertical tangential line $L_2$ of the annular flange.

In accordance with still another embodiment of the present invention, there is provided a work machine which includes a frame and a work implement mechanically coupled to the frame. The work machine also includes an undercarriage frame secured to the frame. The work machine also includes a guide structure having an opening defined therein. The guide structure is secured to the undercarriage frame. The work machine further includes a roller assembly having a body member with (i) a passageway extending therethrough, (ii) a roller surface defined thereon, and (iii) a first annular flange extending from the roller surface. The work machine also includes an axle positioned relative to the body member and the guide structure so that (i) a first portion of the axle is located within the passageway and (ii) a second portion of the axle is located within the opening. The annular flange has a diameter $D_1$. The guide structure has a width $W_3$. The guide structure is positioned relative to the annular flange so that a detached end of the guide structure extends beyond a peripheral edge of the annular flange. The width $W_3$ is less than the diameter $D_1$ so that the guide structure is interposed a first vertical tangential line $L_1$ and a second vertical tangential line $L_2$ of the annular flange.

BRIEF DESCRIPTION OF THE DRAWINGS

FIG. 6 is a perspective view of one guiding arrangement shown in FIG. 2;

FIG. 7 is a cross sectional view of the guiding arrangement shown in FIG. 6.

BEST MODE FOR CARRYING OUT THE INVENTION

Figure 1:
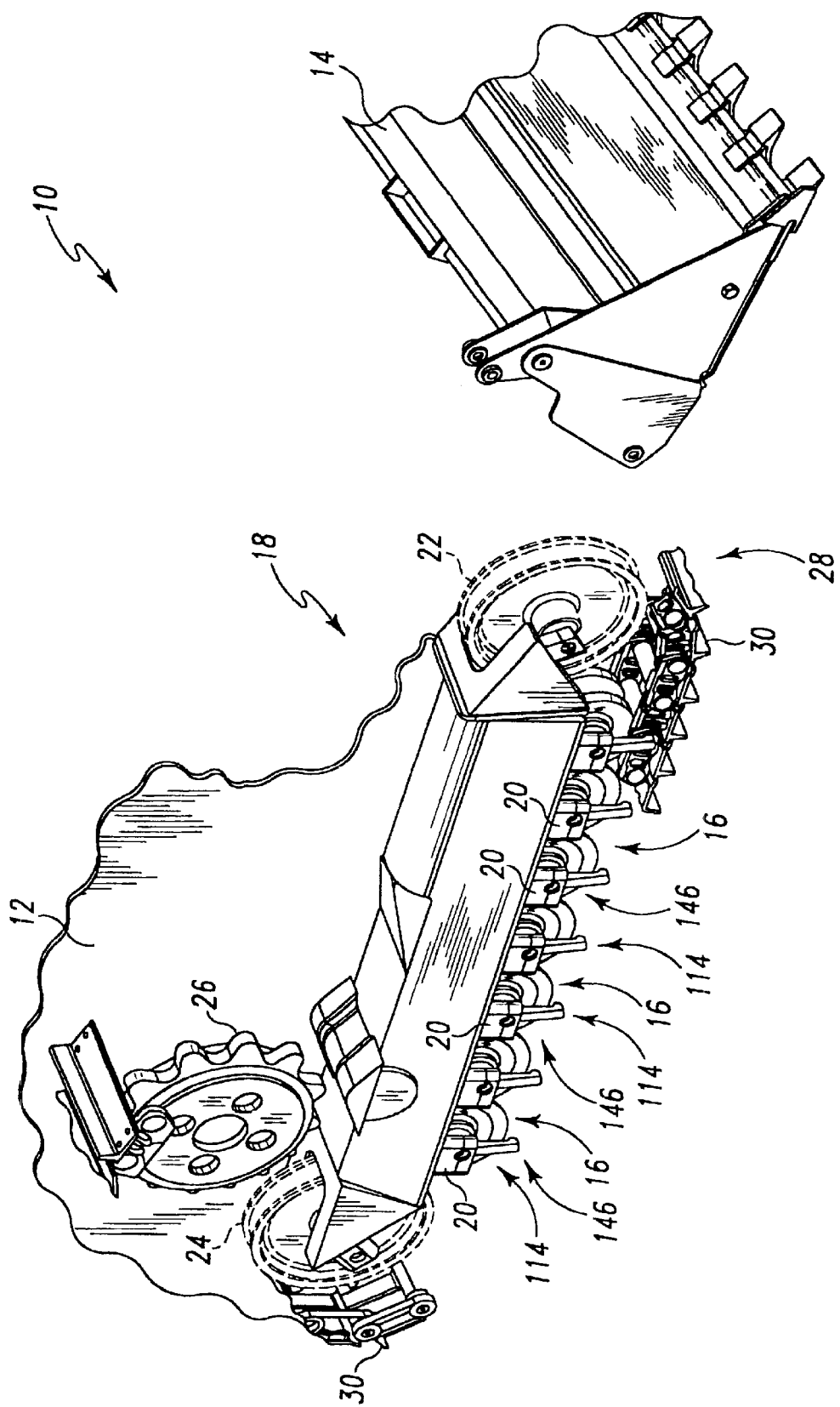
FIG. 1 is a fragmentary perspective view of a work machine which incorporates the features of the present invention therein.

Referring now to FIG. 1 there is shown a portion of a track type work machine 10 which incorporates the features of the present invention therein. Work machine 10 includes a frame 12, a work implement 14 (e.g. a bucket), an undercarriage 18, and a track assembly 28. Work implement 14 and undercarriage 18 are both mechanically coupled to frame 12. Undercarriage 18 includes a rear idler 24, a drive sprocket 26, a front idler 22, an undercarriage frame 20, and a track assembly 28. Rear idler 24, drive sprocket 26, front idler 22, and undercarriage frame 20 are all mechanically coupled to frame 12 so as to define the path abut which track assembly 28 rotates during the use of work machine 10. Undercarriage 18 also includes a number of roller assemblies 16 and guiding arrangements 146 mechanically coupled to undercarriage frame 20.

Figure 2:
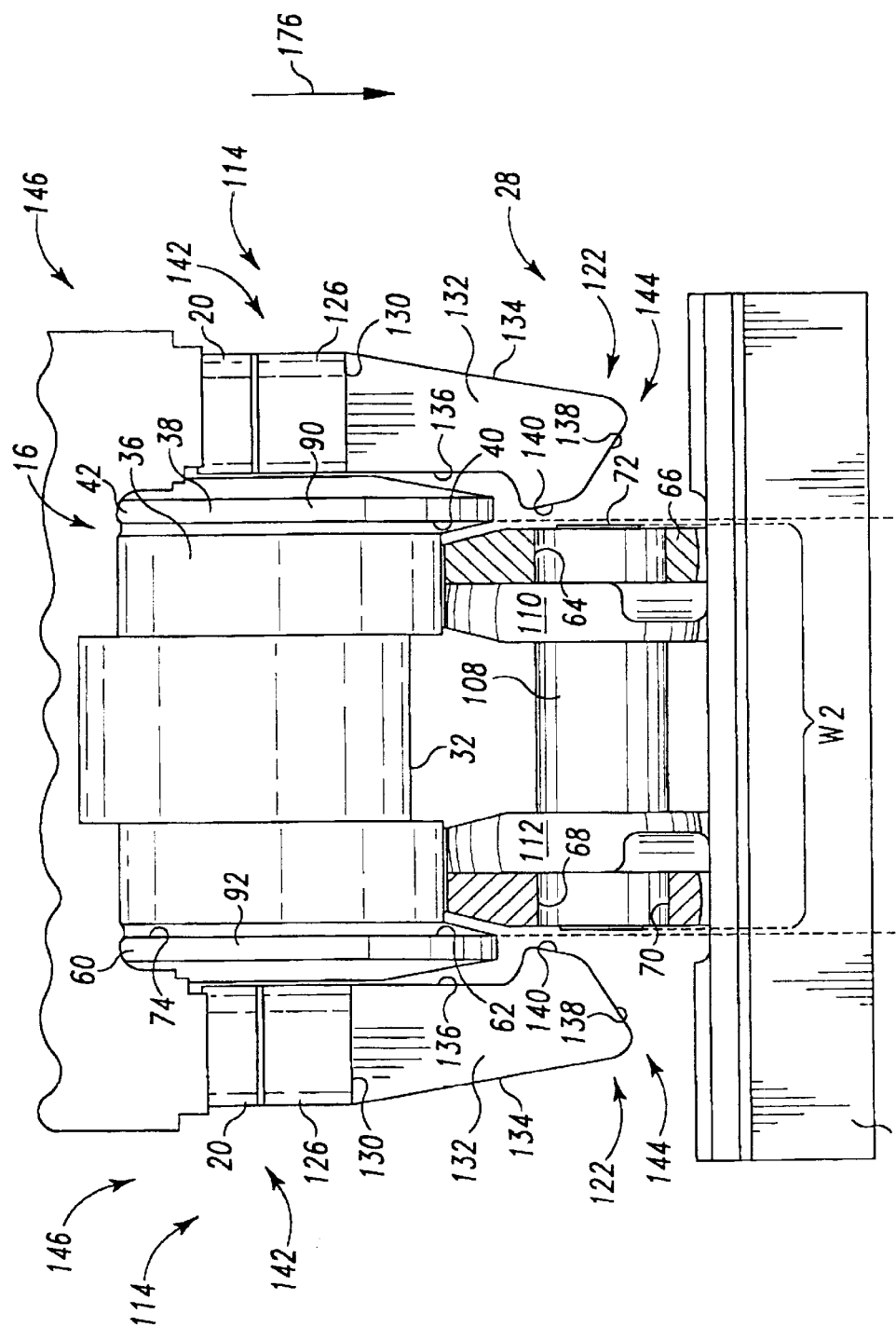
FIG. 2 is a fragmentary front elevational view of a roller assembly engaging the track assembly of the work machine of FIG. 1, note that a pair of guiding arrangements are also shown.

As shown in FIGS. 1 and 2 track assembly 28 includes an outer link 64 and an outer link 68 mechanically coupled to a pair of inner links 110 and 112. In particular, outer link 64 has an end portion with an aperture 66 defined therethrough. Inner link 110 also has an end portion with an aperture (not shown) defined therethrough. Outer link 64 and inner link 110 are positioned relative to one another such that aperture 66 and the aperture defined in inner link 110 are linearly aligned. Outer link 68 has an end portion with an aperture 70 defined therethrough. Inner link 112 also has an end portion with an aperture (not shown) defined therethrough. Outer link 68 and inner link 112 are positioned relative to one another such that aperture 70 and the aperture defined in inner link 112 are linearly aligned. A bushing 108 having a passageway (not shown) with a track pin 72 disposed therein is inserted through apertures 66 and 70 and the apertures defined in inner links 110 and 112. Inserting bushing 108 and track pin 72 in the above described manner mechanically couples outer links 64 and 68 to inner links 110 and 112. The other end portion of outer links 64 and 68 are coupled to another adjacent pair of inner links 110 and 112 with a bushing 108 and a track pin 72 in a substantially identical manner. A plurality of outer links 64 and 68 and inner links 110 and 112 are coupled together in the above described manner until a continuous loop is formed. A number of track shoes 30 are then secured to the links of track assembly 28 in a well known manner.

Figure 3:
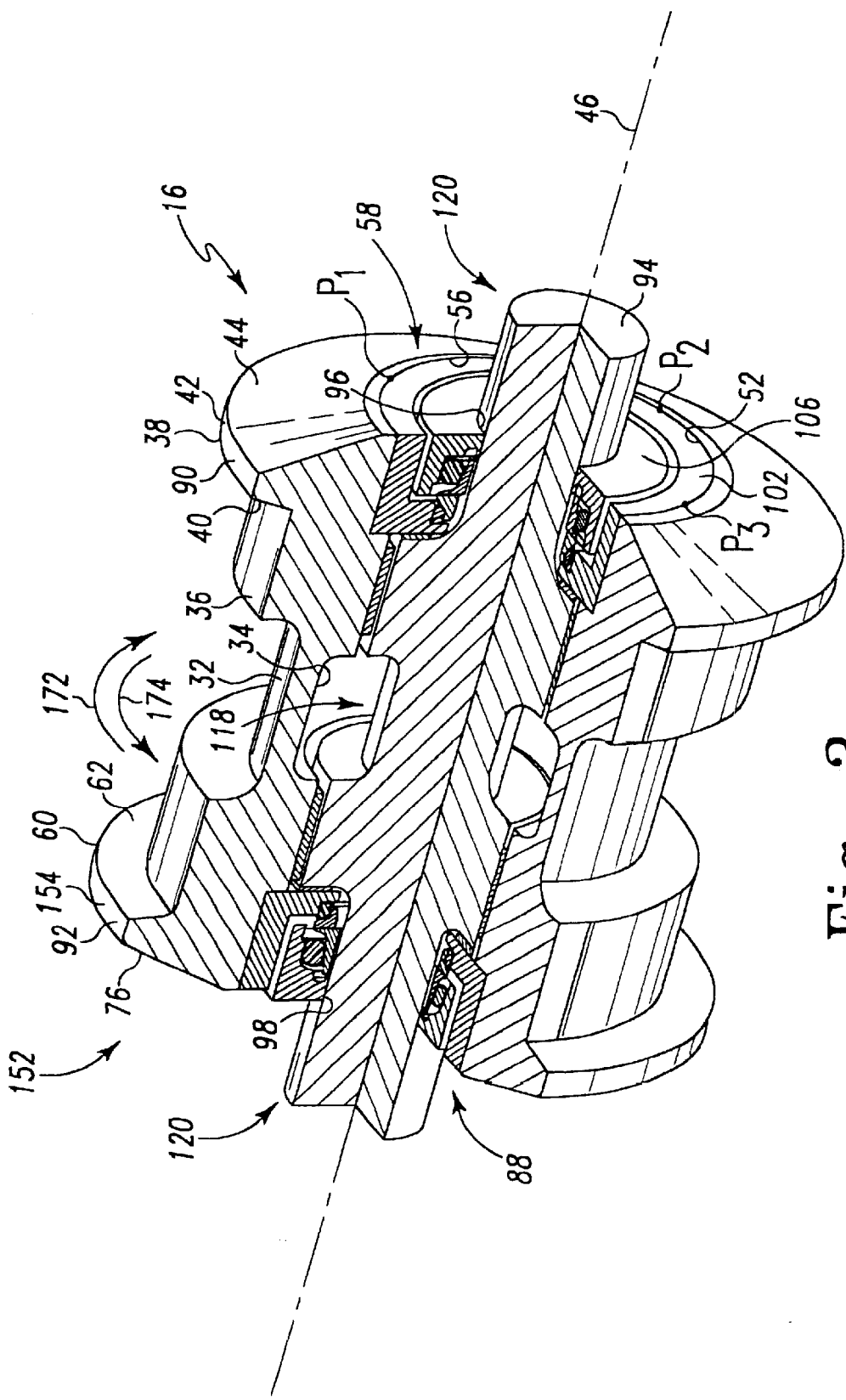
FIG. 3 is a cross sectional perspective view of the roller assembly of FIG. 2.
Figure 4:
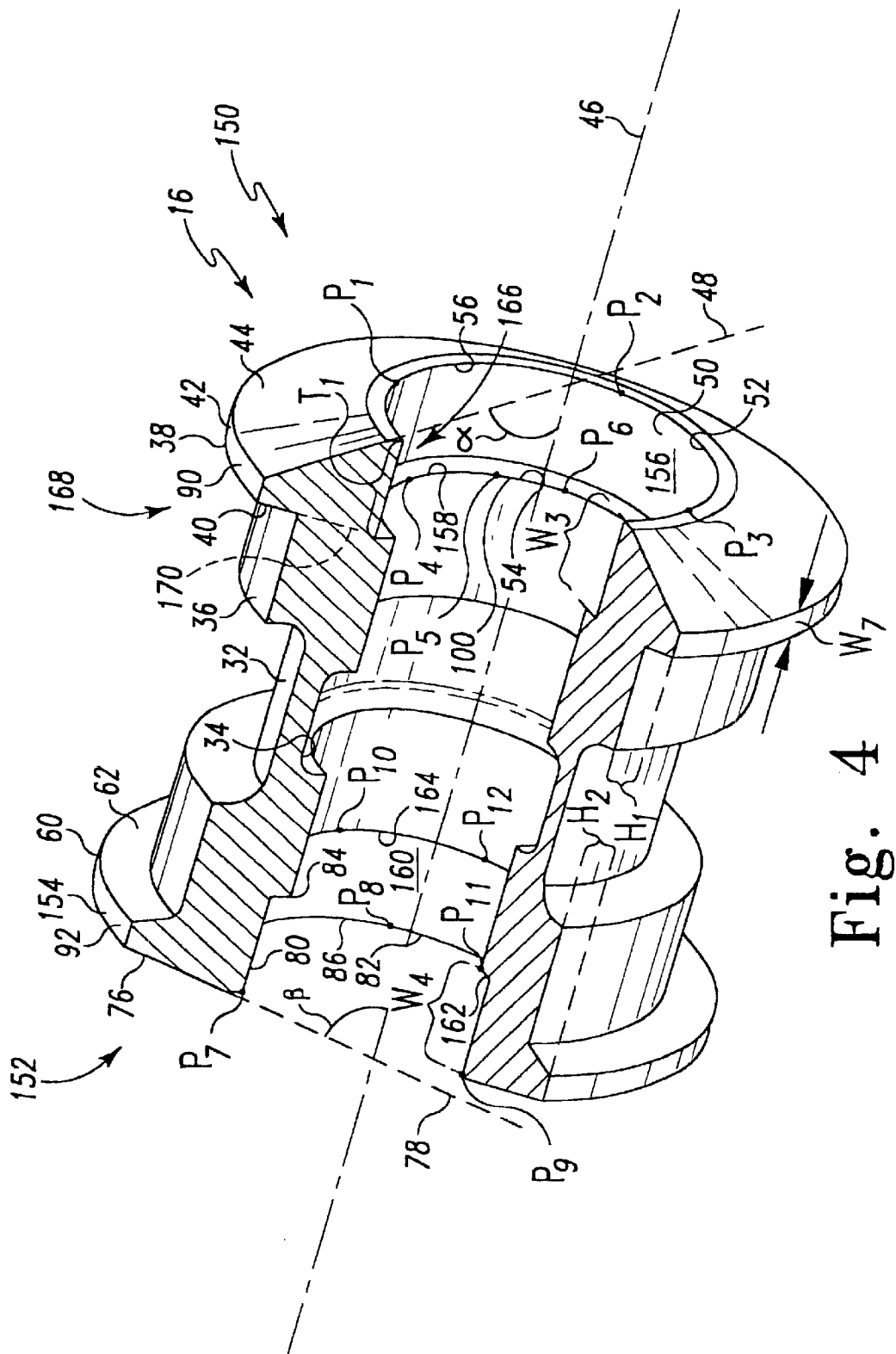
FIG. 4 is a cross sectional perspective view of the roller assembly of FIG. 3 with the axle and axle mounting arrangement shown removed.
Figure 5:
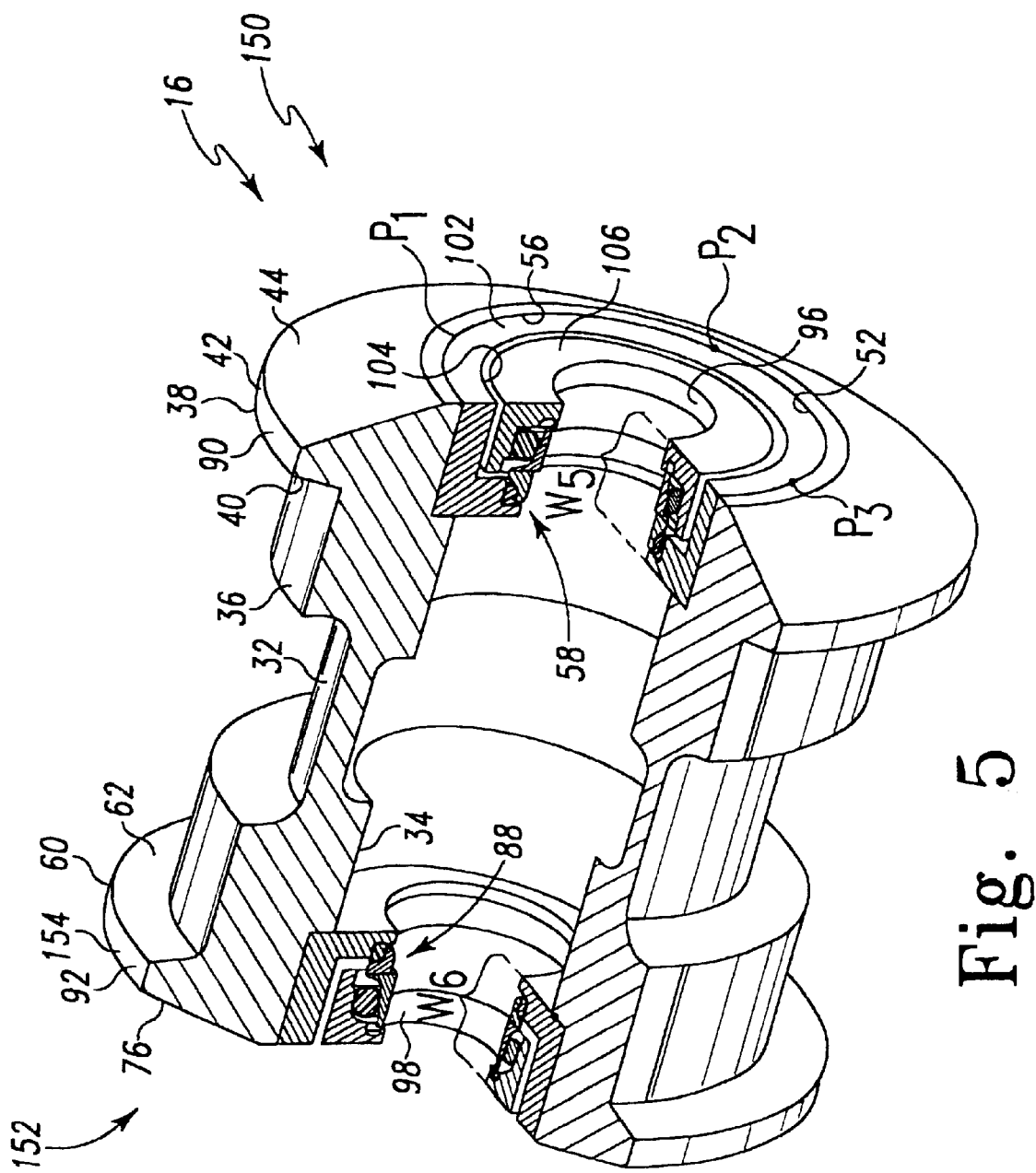
FIG. 5 is a cross sectional perspective view of the roller assembly of FIG. 3 with the axle shown removed.

Referring to FIGS. 3, 4, and 5, each roller assembly 16 has a body member 32 with (i) a passageway 34 extending therethrough and (ii) a roller surface 36 defined thereon. An end portion 150 of body member 32 has an inner side wall segment 40 which extends outwardly from roller surface 36. An outer side wall segment 44 is secured to inner side wall segment 40 via an end wall segment 42 interposed inner side wall segment 40 and outer side wall segment 44. Inner side wall segment 40 and outer side wall segment 44 define a roller rim 38 in the form of an annular flange 90 which extends outwardly from roller surface 36. As shown more clearly in FIG. 4, outer side wall segment 44 is positioned relative to an axis of rotation 46 of body member 32 such that a linear extension 48 of outer side wall segment 44 intersects axis of rotation 46 so as to define an acute angle α therebetween. For example, α can be 45 to 90 degrees.

Another end portion 152 of body member 32 also has an inner side wall segment 62 which extends outwardly from roller surface 36. An outer side wall segment 76 is secured to inner side wall segment 62 via an end wall segment 154 interposed inner side wall segment 62 and outer side wall segment 76. Inner side wall segment 62 and outer side wall segment 76 also define a roller rim 60 in the form of an annular flange 92 which extends outwardly from roller surface 36. Outer side wall segment 76 is positioned relative to axis of rotation 46 of body member 32 such that a linear extension 78 of outer side wall segment 46 also intersects axis of rotation 46 so as to define an acute angle β therebetween. For example, β can be 45 to 90 degrees. It should be appreciated that inner side wall segment 40 and inner side wall segment 62 define a roller space 74 having a width $W_1$ therebetween.

Flanges 90 extends outwardly from roller surface 36 at a height $H_1$ of about 20 millimeters to about 30 millimeters. In addition, flange 92 extends outwardly from roller surface 36 at a height $H_2$ of about 20 millimeters to about 30 millimeters. Preferably, flanges 90 and 92 extend outwardly from roller surface 36 at a height $H_1$ and $H_2$, respectively, of about 21.5 millimeters. As will be discussed below in greater detail, having a flanges 90 and 92 extend from roller surface 36 about 20 millimeters to about 30 millimeters is an advantage of the present invention since a flange with a height of less than about 20 millimeters does not provide a reliable guiding function. On the other hand a flange with a height of more than about 30 millimeters tends to be structurally weak and is therefore prone to being fractured or broken during use of work machine 10.

Body member 32 has a receptacle 50 defined therein. Receptacle 50 is defined by wall a segment 156 and a wall segment 158. Receptacle 50 has an outer entrance 52 and an inner entrance 54. Outer entrance 52 is defined by an edge 56 of wall segment 156. Edge 56 has a point $P_1$, a point $P_2$, and a point $P_3$ defined thereon. Points $P_1$, $P_2$, and $P_3$ define a first plane. Inner entrance 54 is defined by an edge 100 of wall segment 158. Edge 100 has a point $P_4$, a point $P_5$, and a point $P_6$ defined thereon. Points $P_4$, $P_5$, and $P_6$ define a second plane.

Figure 8:
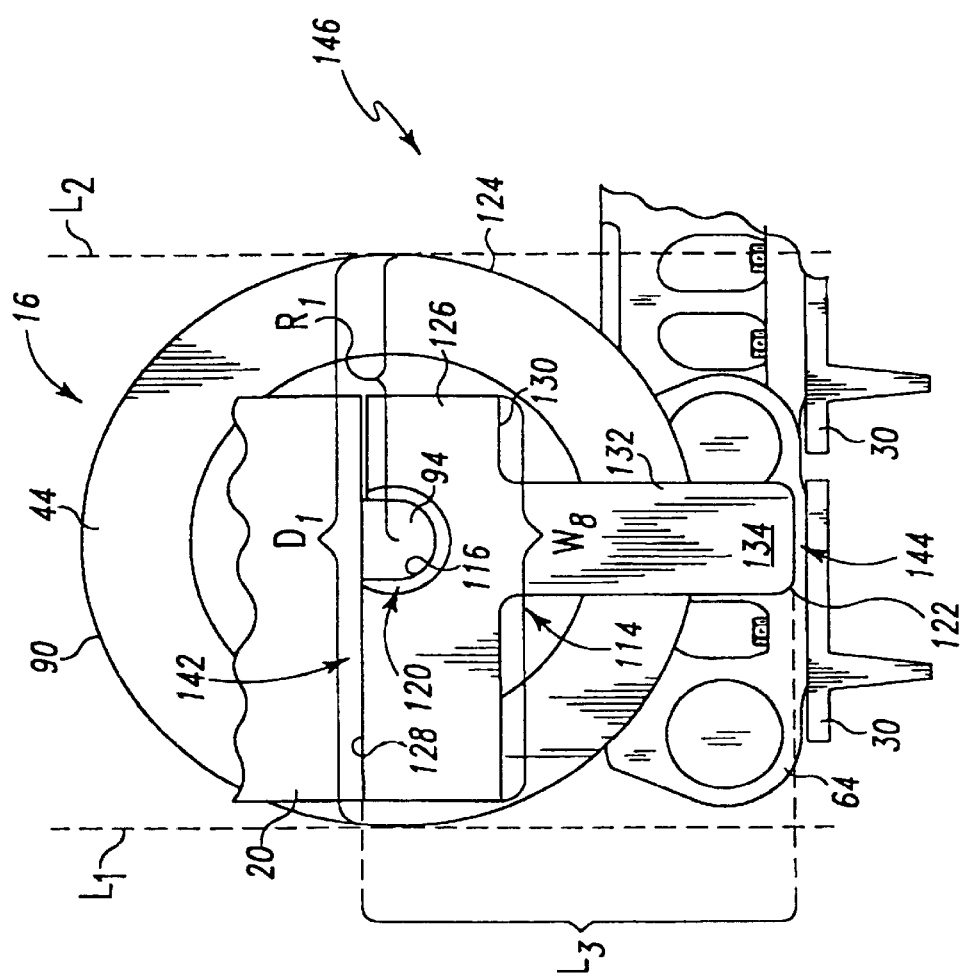
FIG. 8 is a side elevational view of a roller assembly, a guide structure, and a portion of the track assembly of the work machine of FIG. 1.

As shown more clearly in FIG. 8, guide structure 114 has a length $L_3$ and a width $W_8$, and flange 90 of roller assembly 16 has a diameter $D_1$ and a radius $R_1$. Length $L_3$ is greater radius $R_1$ so that when axle 94 is positioned within opening 116 of mounting member 126 in the above described manner a detached end 122 defined on second end 144, and thus leg member 132, of guide structure 114 extends beyond a peripheral edge 124 of flange 90. Moreover, width $W_8$ of guide structure 114 is less than diameter $D_1$ of flange 90 so that when axle 94 is located within opening 116 guide structure 114 is interposed a vertical tangential line $L_1$ and a vertical tangential line $L_2$ of flange 90. Having the width $W_8$ configured so that guide structure 114 fits between vertical tangential line $L_1$ and a vertical tangential line $L_2$ of flange 90 is an advantage of the present invention since it decreases the size of guide structure 114 which in turn decreases the weight and cost of manufacturing guide structure 114. This is contrast to other guide structure designs which have an elongated shape which substantially run the entire length of the undercarriage. These type of guide structures are relatively heavy and expensive to manufacture as compared to the present invention.

It should be understood that utilizing and positioning guide structure 114 relative to axle 94 in the above described manner enhances the guiding function of guide structure 114. In particular, utilizing guide structure 114 to mount roller assembly 16 to undercarriage frame 20 and having leg member 132 extend from axle 94 in a radial direction ensures that guide structure 144 is positioned directly adjacent to the track assembly 28/roller assembly 16 interface. Having guide structure 144 directly adjacent to the track assembly 28/roller assembly 16 interface facilitates the ability of guide structure 114 to direct track assembly 28 back into roller space 74 and into contact with roller surface 36 if derailment of track assembly 28 does occur.

In addition, having guide structure 114 is positioned directly adjacent to the track assembly 28/roller assembly 16 interface allows track assembly 28 to back bend up between roller assemblies 16 during use of work machine 10 without the guide structures 114 interfering with track assembly 28 during the back bend. Other designs which position the guide structures between adjacent roller assemblies have to be located a greater distance away from the track assembly so they do not interfere with the aforementioned back bend function. Having the guide structures located a greater distance away from the track assembly decreases their ability to direct the track assembly back into the roller space if a derailment occurs.

Track assembly 28 is disposed around front idler 22, rear idler 24, and drive sprocket 26. In addition, as shown in FIG. 2, track assembly 28 is positioned relative to roller assemblies 16 such that (i) track assembly 28 is located within roller space 74 and (ii) outer links 64 and 68 and inner links 110 and 112 are in contact with roller surface 36. It should be understood that (i) roller space 74 has a width $W_1$, (ii) track assembly 28 has a width $W_2$ (note that track assembly 28 does not include track shoes 30), and (iii) width $W_1$ is greater than width $W_2$. Having the width $W_2$ of track assembly 28 smaller than the width $W_1$ of roller space 74 is an advantage of the present invention. In particular, as track assembly 28 is utilized the surfaces of outer links 64 and 68 and inner links 110 and 112 in contact with roller surface 36 tend to wear down which in turn causes roller assembly 16 to move in the direction indicated by arrow 176. Having the width $W_2$ of track assembly 28 smaller than the width $W_1$ of roller space 74 results in an obstruction free path for roller assembly 16 to move in the direction of arrow 176. In other words, no portion of track assembly 28 protrudes outwardly such that track assembly 28 would obstruct the movement of roller assembly 16 in the direction of arrow 176. Therefore, track assembly 28 can be utilized longer, or worn down to a greater extent, before requiring maintenance. This is in contrast to other roller assembly and track assembly designs in which the width of the track assembly is greater than the width of the roller space. For example, the track assembly may have a track pin boss which protrudes outwardly and is located directly under a flange of the roller assembly. In this situation, the pin boss limits the distance the roller assembly can travel in the direction indicated by arrow 176 since the roller assembly will eventually contact the pin boss and thus cause undue wear on the roller assembly. As such, the track assembly will require maintenance in a relatively shorter period of time as compared to the present invention.

INDUSTRIAL APPLICABILITY

During use of work machine 10, track assembly rotates around a path defined by front idler 22, rear idler 24, drive sprocket 26, and roller assemblies 16 thereby propelling work machine 10 over the ground to perform various work functions with implement 14. During the aforementioned rotation track assembly 28 is maintained within roller space 74 by flanges 90 and 92. It should be understood that flanges 90 and 92 have heights $H_1$ and $H_2$, respectively, (i.e. about 20 millimeters to about 30 millimeters) that only two flanges per roller assembly 16 are required to provide the primary guiding function and maintain track assembly 28 within roller space 74 and in contact with roller surface 36. This is contrast to other roller assembly designs which require four flanges extending from the roller surface (one inner and one outer link are interposed one pair of flanges) to provide the primary guiding function. Having four flanges extending from the roller surface increases the cost of manufacturing the roller assemblies.

However, if track assembly 28 does become disengaged from the roller assemblies 16, guide structures 114 are positioned so as to effectively direct track assembly 28 back into roller space 74. In particular, detached end 122 of leg member 132 contact track assembly 28 and directs the same back into roller space 74. Specifically, end wall segment 138 contact track assembly 28 so as to direct the same back into roller space 74. It should be appreciated that having end wall segment 138 and lateral side wall segment 134 spatially oriented so as to define an acute angle φ therebetween (see FIG. 7) facilitates the guiding of track assembly 28 back into roller space 74. This is true since the angling of end wall segment 138 directs track assembly 28 back toward roller space 74 when track assembly comes into contact with end wall segment 138. This is different from other guide structures which have a squared off detached end which is less effective in directing a disengaged track assembly back to the roller space.

Other aspects, objects and advantages of this invention can be obtained from a study of the drawings, disclosures, and the appended claims.

What is claimed is:

1. A guiding arrangement for a track type work machine, comprising:

a guide structure having an opening defined therein;

a roller assembly having a body member with (i) a passageway extending therethrough, (ii) a roller surface defined thereon, and (iii) an annular flange extending from said roller surface; and an axle positioned relative to said body member and said guide structure so that (i) a first portion of said axle is located within said passageway and (ii) a second portion of said axle is located within said opening, wherein (i) said annular flange has a diameter $D_1$, (ii) said guide structure has a width $W_8$, (iii) said guide structure is positioned relative to said annular flange so that a leg member of said guide structure extends beyond a peripheral edge of said annular flange, and (iv) said width $W_8$ is less than said diameter $D_1$ so that said guide structure is interposed a first vertical tangential line $L_1$ and a second vertical tangential line $L_2$ of said annular flange.

2. The guiding arrangement of claim 1, wherein:

said guide structure includes (i) a mounting member having an upper surface and a lower surface, said leg member extends outwardly from said lower surface of said mounting member, and said opening is defined in said mounting member.

3. The guiding arrangement of claim 2, wherein:

said leg member includes (i) a first lateral side wall, (ii) a second lateral side wall in an opposing relationship with said first lateral side wall, and (iii) an end wall segment, and said first lateral side wall is secured to said end wall segment so that an acute angle is defined therebetween.

4. The guiding arrangement of claim 3, wherein:

said leg member includes a protrusion which extends outwardly from said second lateral side wall.

5. The guiding arrangement of claim 1, wherein:

said leg member extends in a radial direction relative to said axle.

6. The guiding arrangement of claim 2, wherein:

said opening is defined in said upper surface of said mounting member.

7. The guiding arrangement of claim 1, wherein:

said annular flange has a radius $R_1$, said guide structure has a length $L_3$, and said length $L_3$ is greater than said radius $R_1$.

8. The guiding arrangement of claim 1, including:

a track link positioned in contact with said roller surface of said body member.

9. An undercarriage for a track type work machine, comprising:

an undercarriage frame;

a guide structure having (i) a first end and a second end and (ii) an opening defined therein;

a roller assembly having a body member with (i) a passageway extending therethrough, (ii) a roller surface defined thereon, and (iii) an annular flange extending from said roller surface;

an axle positioned relative to said body member and said guide structure so that (i) a first portion of said axle is located within said passageway and (ii) a second portion of said axle is located within said opening such that said guide structure extends outwardly in a radial direction from an axis of rotation of said body member; and a track link positioned in contact with said roller surface, wherein (i) said first end of said guide structure is secured to said undercarriage frame, (ii) said annular flange has a diameter $D_1$, (iii) said guide structure has a width $W_3$, (iv) said guide structure is positioned relative to said annular flange so that said second end of said guide structure extends beyond a peripheral edge of said annular flange, and (v) said width $W_3$ is less than said diameter $D_1$ so that said guide structure is interposed a first vertical tangential line $L_1$ and a second vertical tangential line $L_2$ of said annular flange.

10. The undercarriage of claim 9, wherein:

said guide structure includes a leg member which extends outwardly from said axis of rotation in said radial direction, said leg member having (i) a first lateral side wall, (ii) a second lateral side wall in an opposing relationship with said first lateral side wall, and (iii) an end wall segment, and said first lateral side wall is secured to said end wall segment so that an acute angle is defined therebetween.

11. The undercarriage of claim 10, wherein:

said leg member includes a protrusion which extends outwardly from said second lateral side wall.

12. The undercarriage of claim 9, wherein:

said guide structure includes (i) a mounting member having an upper surface and a lower surface and (ii) a leg member, said first end of said guide structure is defined on said mounting member, said opening is defined in said mounting member, said upper surface is in contact with said undercarriage frame, said second end of said guide structure is defined on said leg member, and said leg member extends outwardly from said lower surface of said mounting member.

13. The undercarriage of claim 12, wherein:

said opening is defined in said upper surface of said mounting member.

14. A work machine, comprising:

a frame;

a work implement mechanically coupled to said frame;

an undercarriage frame secured to said frame;

a guide structure having an opening defined therein, said guide structure being secured to said undercarriage frame;

a roller assembly having a body member with (i) a passageway extending therethrough, (ii) a roller surface defined thereon, and (iii) a first annular flange extending from said roller surface; and an axle positioned relative to said body member and said guide structure so that (i) a first portion of said axle is located within said passageway and (ii) a second portion of said axle is located within said opening, wherein (i) said annular flange has a diameter $D_1$, (ii) said guide structure has width $W_8$, (iii) said guide structure is positioned relative to said annular flange so that a leg member of said guide structure extends beyond a peripheral edge of said annular flange, and (iv) said width $W_8$ is less than said diameter $D_1$ so that said guide structure is interposed a first vertical tangential line $L_1$ and a second vertical tangential line $L_2$ of said annular flange.

15. The work machine of claim 14, including:

a track assembly having a (i) a first outer link with a first aperture defined therein, (ii) a second outer link with a second aperture defined therein, and (iii) a track pin positioned within said first aperture and said second aperture, wherein said first outer link and said second outer link are positioned in contact with said roller surface of said body member.

16. The work machine of claim 15, including:

a second annular flange extending from said roller surface, wherein (i) said first annular flange has a first inner side wall segment, (ii) said second annular flange has a second inner side wall segment, (iii) said first inner side wall segment and said second inner side wall segment define a roller space therebetween, (iv) said roller space has a width $W_1$, and (ii) said track assembly has a with $W_2$ which is less than said width $W_1$.

17. The work machine of claim 14, wherein:

said guide structure includes (i) a mounting member having an upper surface and a lower surface, said leg member extends outwardly from said lower surface of said mounting member, and said opening is defined in said mounting member.

18. The work machine of claim 17, wherein:

said leg member includes (i) a first lateral side wall, (ii) a second lateral side wall in an opposing relationship with said first lateral side wall, and (iii) an end wall segment, and said first lateral side wall is secured to said end wall segment so that an acute angle is defined therebetween.

19. The work machine of claim 18, wherein:

said leg member includes a protrusion which extends outwardly from said second lateral side wall.

20. The work machine of claim 17, wherein:

said leg member extends in a radial direction relative to said axle.

* * * * *